United States Patent
Hirabayashi et al.

(10) Patent No.: US 7,161,762 B2
(45) Date of Patent: Jan. 9, 2007

(54) MAGNETIC RECORDING AND REPRODUCTION APPARATUS

(75) Inventors: Koichiro Hirabayashi, Osaka (JP); Yoshiyuki Saito, Osaka (JP); Hiroshi Kurumatani, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 426 days.

(21) Appl. No.: 10/803,127

(22) Filed: Mar. 17, 2004

(65) Prior Publication Data

US 2004/0207946 A1    Oct. 21, 2004

(30) Foreign Application Priority Data

Mar. 19, 2003  (JP) .............................. 2003-075671

(51) Int. Cl.
*G11B 15/20*  (2006.01)

(52) U.S. Cl. ........................................ 360/85

(58) Field of Classification Search .................... None
See application file for complete search history.

(56) References Cited

U.S. PATENT DOCUMENTS 6,256,167 B1 *  7/2001  Konishi et al. ........ 360/130.23
6,449,118 B1 *  9/2002  Choi et al. ..................... 360/85
6,567,234 B1 *  5/2003  Matsuoka et al. ......... 360/96.5
2001/0042807 A1 * 11/2001 Sawai et al. ............. 242/356.2
2003/0011924 A1 *  1/2003  Matsuoka et al. ............ 360/85

* cited by examiner

*Primary Examiner*—Hoa T. Nguyen
*Assistant Examiner*—Mark Blouin
(74) *Attorney, Agent, or Firm*—Renner, Otto, Boisselle & Sklar, LLP (57) ABSTRACT

A magnetic recording and reproduction apparatus includes a main chassis having a rotatable head cylinder provided thereon; a sub chassis on which a tape cassette is mountable; and a plurality of tape pull-out members acting so as to pull out a tape from the tape cassette. The sub chassis is movable with respect to the main chassis between a tape cassette mountable position and a tape pull-out completion position, and the tape cassette mountable position is the position at which the tape cassette is mountable on the sub chassis and the tape pull-out completion position is the position at which information recording to, and information reproduction from, the tape which has been pulled out from the tape cassette and wound around the rotatable head cylinder can be performed. All the plurality of tape pull-out members are mounted on the sub chassis.

5 Claims, 10 Drawing Sheets

MAGNETIC RECORDING AND REPRODUCTION APPARATUS

This non-provisional application claims priority under 35 U.S.C., §119(a), on Patent Application No. 2003-075671 filed in Japan on Mar. 19, 2003, the entire contents of which are hereby incorporated by reference.

BACKGROUND OF THE INVENTION

1. Field of the Invention

The present invention relates to a magnetic recording and reproduction apparatus, and in particular to a magnetic recording and reproduction apparatus having a mechanism for moving a sub chassis relative to a main chassis.

2. Description of the Related Art

Recently, the reduction of size and the number of components and the simplification of the structure of magnetic recording and reproduction apparatuses has been actively pursued.

Hereinafter, a conventional magnetic recording and reproduction apparatus will be described.

One known conventional magnetic recording and reproduction apparatus is described in Japanese Laid-open Publication No. 11-328773. A tape pull-out mechanism of the magnetic recording and reproduction apparatus is shown in FIGS. 18, 19, 24, 25, 26 and 27 of Japanese Laid-Open Publication No. 11-328773.

A cam gear 66 is driven by a motor (not shown) mounted on a main chassis 8 to pivot forward or backward. A boat driving arm 73 is driven by a driving pin 75 provided on the cam gear 66 to pivot about a pivoting center 74.

A gear 77 is provided at a tip of the boat driving arm 73, and is engaged with integral S loading gears 78, 79 and 80. The S loading gears 78, 79 and 80 are pivoted by the boat driving arm 73. An S loading arm 81 is pivoted by a pivoting force of the S loading gears 78, 79 and 80. An S boat 39 is moved from a cassette mounting position (FIG. 18) to a tape pull-out position (FIG. 19) by a pivoting force of the S loading arm 81. Thus, a magnetic tape is pulled out from a tape cassette. The S boat 39 is pressed to a positioning pin 141 provided on the main chassis 8. Thus, the position of the S boat 39 is determined.

In order to determine the position of the S boat 39 by pressing the S boat 39 to the positioning pin 141, a twisted coil spring (not shown) is provided between the S loading gear 79 and the S loading arm 81.

The magnetic tape is pulled out by a T boat 47 in substantially the same manner as by the S boat 39 as follows. A T loading gear 84 is engaged with the S loading gear 79, and is pivoted by a pivoting force of the S loading gear 79. A T loading arm 86 is pivoted by a pivoting force of the T loading gear 84. The T boat 47 is moved from the cassette mounting position to the tape pull-out position by a pivoting force of the T loading arm 86. Thus, the magnetic tape is pulled out from the tape cassette. The T boat 47 is pressed to a positioning pin 142 provided on the main chassis 8. Thus, the position of the T boat 47 is determined.

Figure 10:
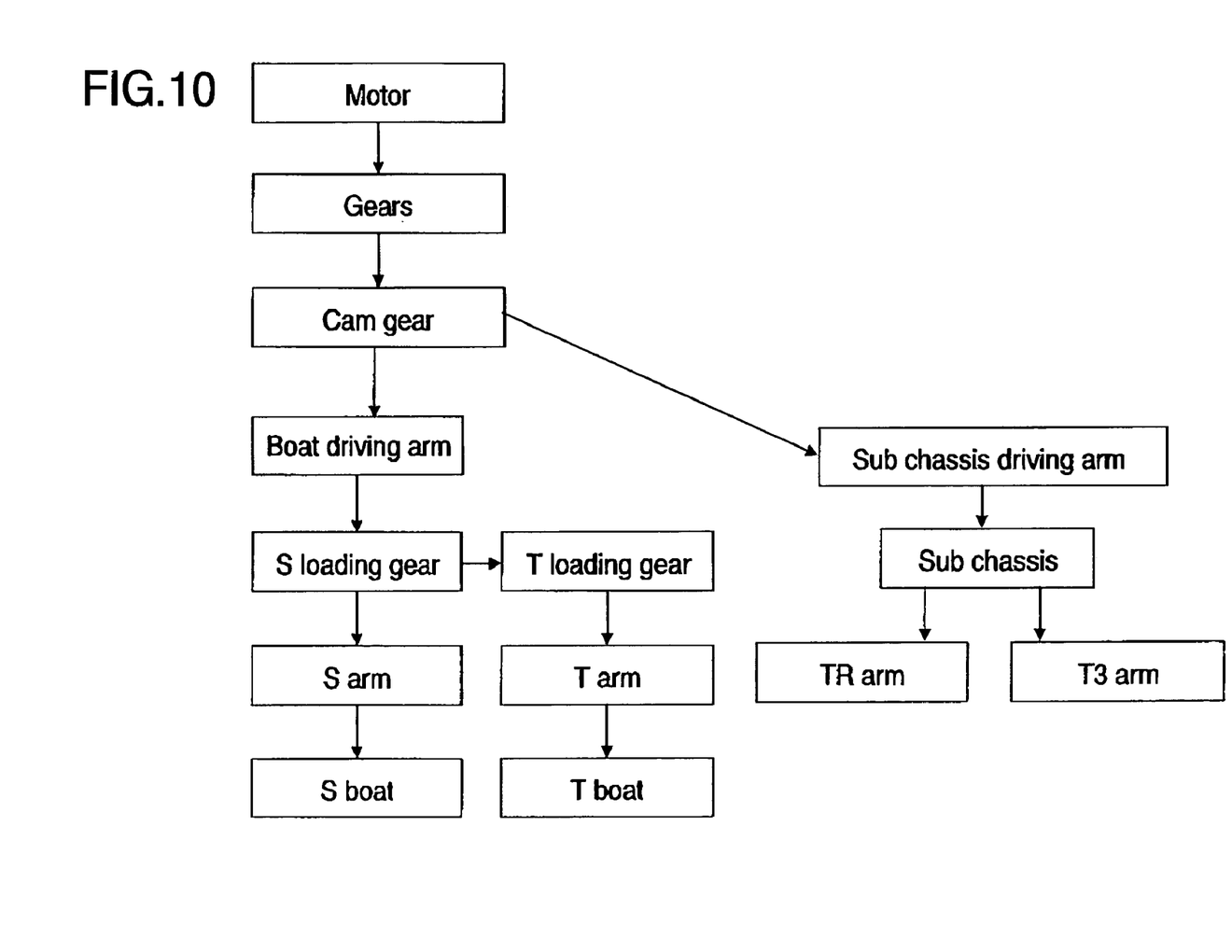
FIG. 10 shows a flow of force generated by a motor of a conventional magnetic recording and reproduction apparatus.

FIG. 10 shows a flow of forces in the tape pull-out mechanism of the conventional magnetic recording and reproduction apparatus described in the above-mentioned publication. A force generated by a motor is divided into two forces by the cam gear, one of which is further divided into two forces by the S loading gears 78, 79 and 80, and the other of which to further divided into two forces by a sub chassis. As can be appreciated, the flow of forces in the tape pull-out mechanism of the conventional magnetic recording and reproduction apparatus is quite complicated.

The conventional magnetic recording and reproduction apparatus has the following problems. Since the pivoting force of the cam gear 66 is conveyed to the S loading arm 81 and the T loading arm 86 via many components including the boat driving arm 73, the S loading gear 79, and the T loading gear 84, the tape pull-out mechanism requires a great number of components. Moreover, the flow of forces in the tape pull-out mechanism is quite complicated as described above, which further increases the number of required components and prevents reduction of the number of components. Since a plurality of arms are provided above and below the cam gear 66, the tape pull-out mechanism is inevitably thick and thus prevents weight reduction of the tape pull-out mechanism. A large range in which the boat driving arm 73 pivots also prevents size reduction of the tape pull-out mechanism.

SUMMARY OF THE INVENTION

A magnetic recording and reproduction apparatus according to the present invention includes a main chassis having a rotatable head cylinder provided thereon; a sub chassis on which a tape cassette is mountable; and a plurality of tape pull-out members acting so as to pull out a tape from the tape cassette. The sub chassis is movable with respect to the main chassis between a tape cassette mountable position and a tape pull-out completion position, and the tape cassette mountable position is the position at which the tape cassette is mountable on the sub chassis and the tape pull-out completion position is the position at which information recording to, and information reproduction from, the tape which has been pulled out from the tape cassette and wound around the rotatable head cylinder can be performed. All the plurality of tape pull-out members are mounted on the sub chassis.

In one embodiment of the invention, each of the plurality of tape pull-out members acts so as to pull out the tape from the tape cassette while the sub chassis moves from the tape cassette mountable position to the tape pull-out completion position.

In one embodiment of the invention, at least one of the plurality of tape pull-out members is engaged with the main chassis.

In one embodiment of the invention, the magnetic recording and reproduction apparatus further includes at least one cam section for driving at least one of the plurality of tape pull-out members. The at least one of the plurality of tape pull-out members is engaged with a corresponding one of the at least one cam section, and the at least one cam section is provided on the main chassis.

In one embodiment of the invention, the magnetic recording and reproduction apparatus further includes a securing guide section provided on the main chassis and an elastic member provided on the main chassis; wherein when the sub chassis moves to a position in the vicinity of the tape pull-out completion position, a portion of one of the plurality of tape pull-out members contacts the elastic member and thus the one of the plurality of tape pull-out members is pressed to the securing guide section, so as to position the one of the plurality of tape pull-out members at a prescribed position.

Thus, the invention described herein makes possible the advantages of providing a magnetic recording and reproduction apparatus including a high performance tape pull-out mechanism which has a simplified flow of force with a simple structure and thus is more lightweight and more compact with a smaller number of components.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to FIGS. 1 through 9.

EXAMPLE 1

A magnetic recording and reproduction apparatus includes a main chassis and a sub chassis. Namely, the magnetic recording and reproduction apparatus according to the present invention has a two-chassis structure.

Figure 1:
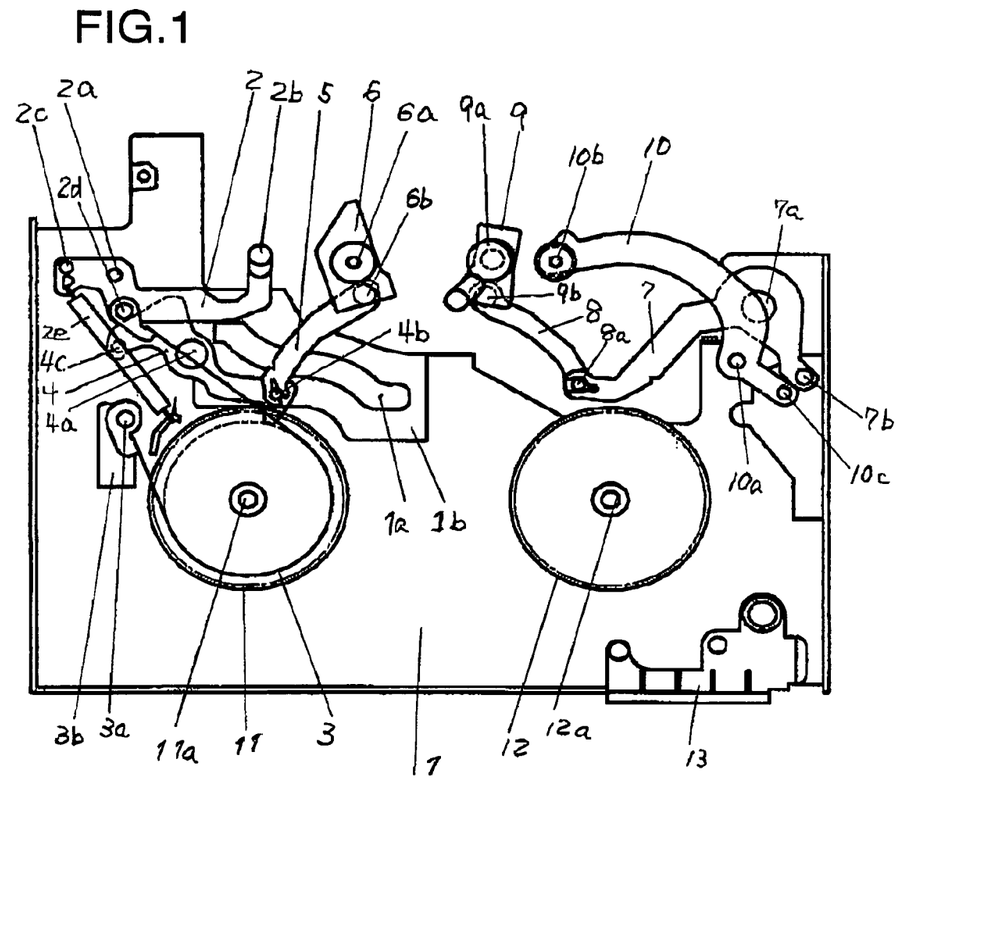
FIG. 1 is a plan view of a sub chassis of a magnetic recording and reproduction apparatus according to the present invention.

First, a structure of a sub chassis 1 of the magnetic recording and reproduction apparatus will be described. FIG. 1 is a plan view of the sub chassis 1.

A sub chassis 1 has a TR arm 2, an S boat 6, a T boat 9 and a T3 arm 10 provided thereon. These tape pull-out members 2, 6, 9 and 10 act to pull out a magnetic tape (not shown in FIG. 1) from a tape cassette.

The TR arm 2 is supported so as to be pivotable about a support 2a on the sub chassis 1. A TR post 2b is provided on a top surface of one end of the TR arm 2, and a TR arm driving pin 2a is provided on a bottom surface of the other end of the TR arm 2.

The T3 arm 10 is supported so as to be pivotable about a support 10a on the sub chassis 1. A T3 post 10b is provided on a top surface of one end of the T3 arm 10, and a T3 arm driving pin 10c is provided on a bottom surface of the other end of the T3 arm 10.

An S arm 4 is supported so as to be pivotable about a support 4a on the sub chassis 1. An S arm driving pin 4c is provided on a bottom surface of one end of the S arm 4, and an S link pin 4b is provided on a top surface of the other end of the S arm 4.

An S link 5 is pivotably attached to the S link pin 4b at one end of the S link 5. The S boat 6 is pivotably attached to the other end of the S link 5 via a boss 6b.

A T arm 7 has substantially the same structure as that of the S arm 4. Specifically, the T arm 7 is supported to be pivotable about a support 7a on the sub chassis 1. A T arm driving pin 7b is provided on a bottom surface of one end of the T arm 7, and a T link pin 8a is provided on a top surface of the other end of the T arm 7.

A T link 8 is pivotably attached to the T link pin 8a at one end of the T link 8. The T boat 9 is pivotably attached to the other end of the T link 8 via a boss 9b.

The S boat 6 has an S roller post 6a standing thereon for guiding the magnetic tape, and the T boat 9 has a T roller post 9a standing thereon for guiding the magnetic tape.

As described above, all the tape pull-out members 2, 6, 9 and 10 are provided on the sub chassis 1.

An S reel stand 11 and a T reel stand 12 are supported so as to be pivotable about a shaft 11a and a shaft 12a, respectively. The S reel stand 11 and the T reel stand 12 are engaged with respective reel hubs of the tape cassette (not shown) when the tape cassette is mounted on the sub chassis 1. This engagement allows the magnetic tape to be taken in.

A brake band (TR band) 3 for controlling the tension of the magnetic tape while the magnetic tape is running is wound around the S reel stand 11. One end of the TR band 3 is supported about a pivotable member 2d of the TR arm 2, and the other end of the TR band 3 is supported about a pivotable member 3a on the sub chassis 1. While the magnetic tape is running, a load acts on the S reel stand 11 via the TR band 3 by a force of a TR spring 2e attached to the TR arm 2.

In a sub chassis adjusting plate 1b, a groove 1a is formed. The sub chassis adjusting plate 1b is secured to the sub chassis 1 by a screw (not shown).

Figure 2:
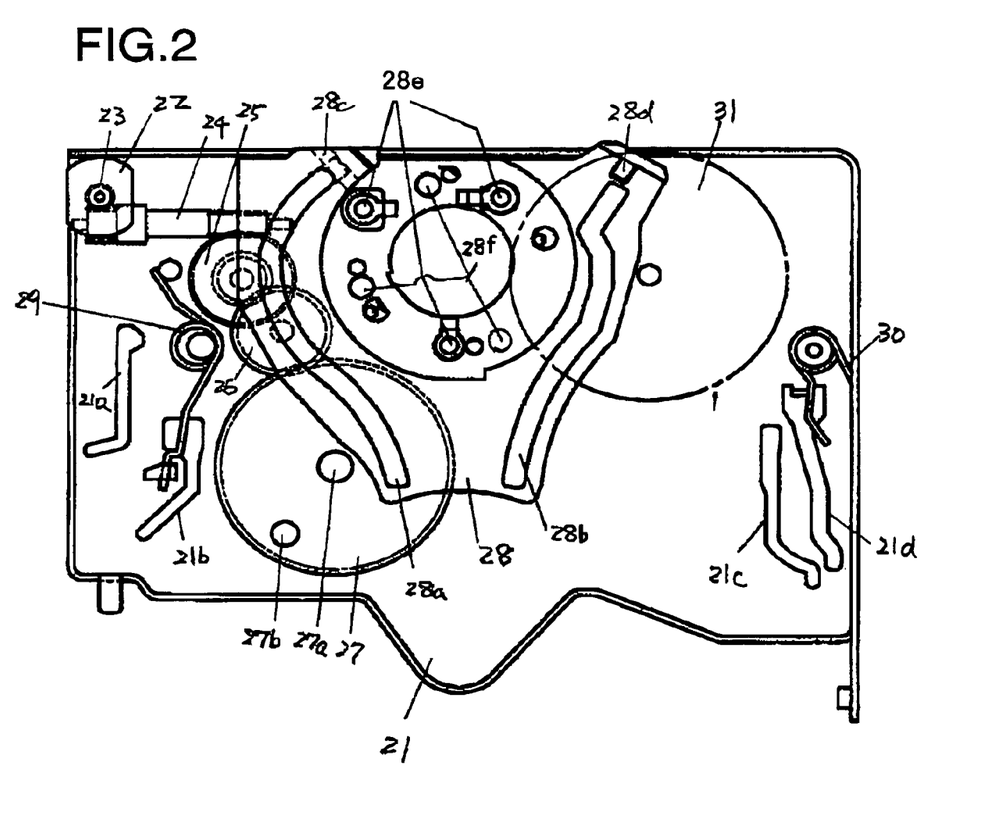
FIG. 2 is a plan view of a main chassis of the magnetic recording and reproduction apparatus according to the present invention.

Next, a structure of a main chassis 21 of the magnetic recording and reproduction apparatus will be described. FIG. 2 is a plan view of the main chassis 21.

The main chassis 21 has four cam grooves 21a, 21b, 21c and 21d formed therein.

A motor 22 is rotatable forward and backward. A rotation force of the motor 22 is conveyed to a mode gear 27 via a motor worm 23, a connection worm 24, and gears 25 and 26. The mode gear 27 is pivotable about a support 27a. A sub chassis driving pin 27b is provided on a top surface of the mode gear 27. The sub chassis driving pin 27b is engaged with the sub chassis 1 (FIG. 1), so that the sub chassis 1 is movable relative to the main chassis 21.

A cylinder base 28 is secured to the main chassis 21 via three cylinder screw holes 28e. A cylinder (not shown) is provided on the cylinder base 28, and is secured with three cylinder screw holes 28f which are screwed from a rear surface of the cylinder base 28.

Guide grooves 28a and 28b are respectively provided for guiding the S boat 6 and the T boat 9 mounted on the sub chassis 1 when the S boat 6 and the T boat 9 pull out the magnetic tape from the tape cassette. Elastic twisted coil springs 29 and 30 are secured on the main chassis 21 in the state of being provided with a pressure by a prescribed force.

Figure 3:
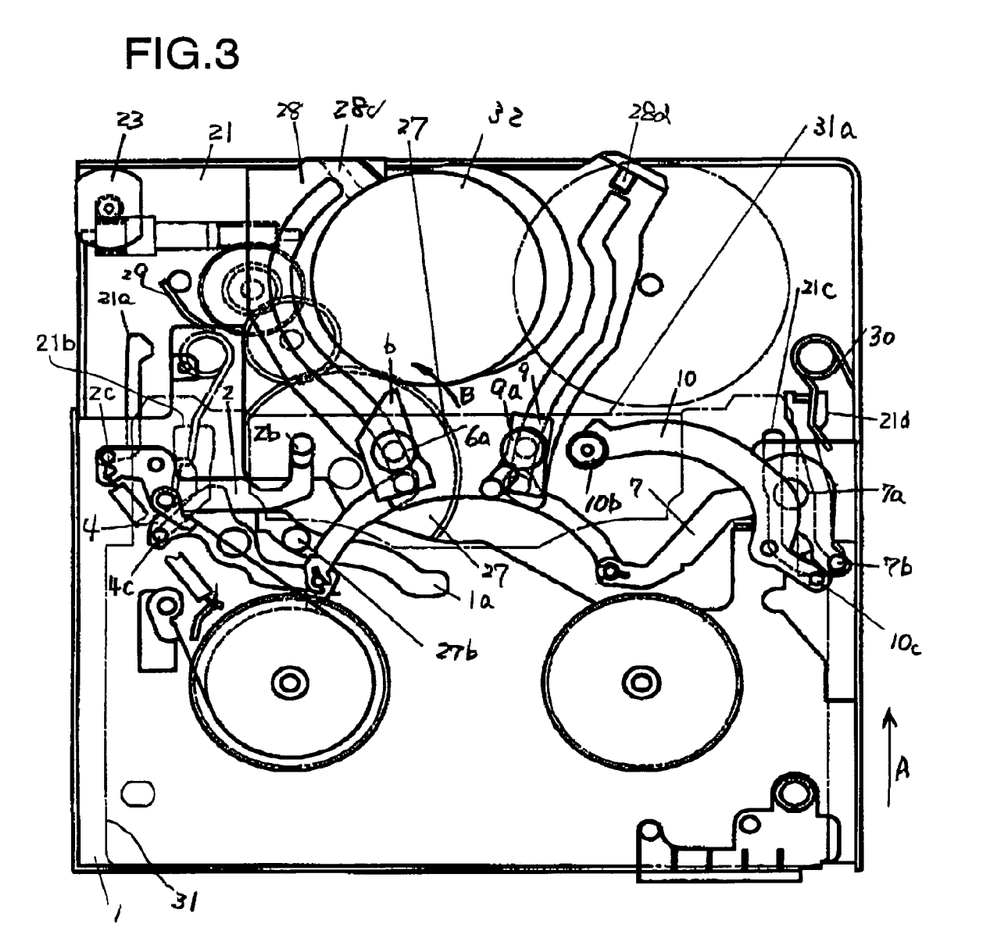
FIG. 3 is a plan view of the magnetic recording and reproduction apparatus according to the present invention in a state where a tape cassette can be mounted on, or taken out from, the sub chassis.

FIG. 3 is a plan view of the magnetic recording and reproduction apparatus according to the present invention, which is obtained by placing the sub chassis 1 shown in FIG. 1 on the main chassis 21 shown in FIG. 2.

In FIG. 3, the magnetic recording and reproduction apparatus is in the state where a tape cassette can be mounted on, or taken out from, the sub chassis 1. In FIG. 3, the sub chassis 1 is at a tape cassette mountable position.

The sub chassis 1 is guided so as to be slidable with respect to the main chassis 21 in a direction represented by arrow A. The TR arm driving pin 2c of the TR arm 2 is slidably engaged with the cam groove 21a of the main chassis 21. The T3 arm driving pin 10c of the T3 arm 3 is slidably engaged with the cam groove 21c of the main chassis 21. The S arm driving pin 4c of the S arm 4 is engaged with the cam groove 21b of the main chassis 21. The T arm driving pin 7b of the T arm 7 is engaged with the cam groove 21d of the main chassis 21.

The sub chassis driving pin 27b on the mode gear 27 on the main chassis 21 is engaged with the groove 1a of the sub chassis adjusting plate 1b (FIG. 1).

With reference to FIG. 3, an operation of the magnetic recording and reproduction apparatus according to the present invention will be described.

As described above, in FIG. 3, the magnetic recording and reproduction apparatus is in the state where a tape cassette can be mounted on the sub chassis 1. In this state, the posts 2b, 6a, 9a and 10b of the tape pull-out members 2, 6, 9 and 10 are all inside the perimeter of the magnetic tape 31a, i.e., in the opening of the tape cassette. When the motor 22 rotates in this state, the mode gear 27 pivots in a direction represented by arrow B, and the sub chassis driving pin 27b also moves in the direction of arrow B. As a result, the sub chassis driving pin 27b moves in the groove 1a of the sub chassis adjusting plate 1b, which moves the sub chassis 1 in the direction of arrow A.

With reference to FIGS. 4A through 4F, an operation of the sub chassis 1 driven by the mode gear 27, i.e., an operation of the sub chassis adjusting plate 1b secured to the sub chassis 1 will be described.

Figure 4A:
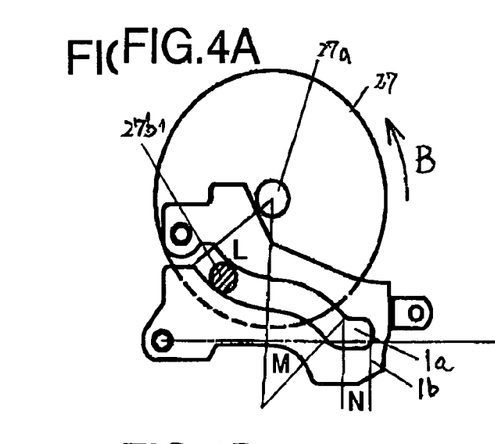
FIGS. 4A through 4F are plan views illustrating an operation of the sub chassis of the magnetic recording and reproduction apparatus according to the present invention.

In FIG. 4A, the sub chassis driving pin 27b is at a tape cassette take-out position 27b1 (the same position as in FIG. 3). As shown In FIG. 4A, the groove 1a of the sub chassis adjusting plate 1b includes an arc portion L, an arc portion M continued with the arc portion L, and a straight portion N continued with the arc portion M. A circle including the arc portion L and a circle including the arc portion N have an identical radius. The arc portion L and the arc portion N are projected in opposite directions from each other.

Figure 4B:
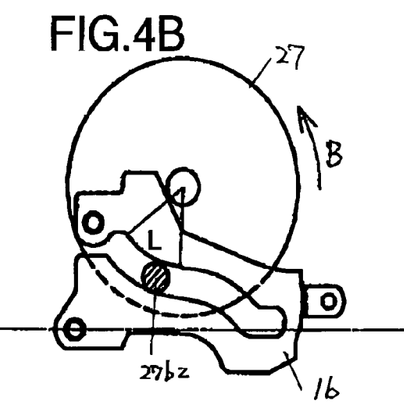

In FIG. 4B, the sub chassis driving pin 27b is at a tape cassette insertable position 27b2. The sub chassis driving pin 27b, which is at the position 27b1 in FIG. 4A, has been moved in the arc portion L and is located at the position 27b2 in FIG. 4B. The shape of the arc portion L is the same as the shape of an arc having the center thereof at the support 27a, about which the mode gear 27 is pivotable. The arc portion L is concentric with an arc drawn by the movement of the sub chassis driving pin 27b about the center of the mode gear 27. More specifically, the radius of the arc portion L is the same as the radius of an arc drawn by the center of the sub chassis driving pin 27b when the sub chassis driving pin 27b moves about the center of the mode gear 27. Therefore, the sub chassis adjusting plate 1b does not move in the direction of arrow A. The sub chassis adjusting plate 1b should not move since the sub chassis 1 needs to be paused between when the sub chassis driving pin 27b is at the tape cassette take-out position and when the sub chassis driving pin 27b is at the tape cassette insertable position.

Figure 4C:
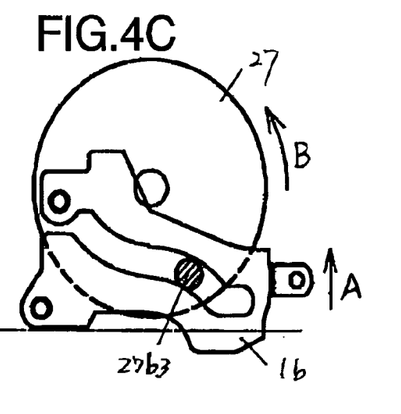

When the mode gear 27 further pivots in the direction of arrow B, the sub chassis driving pin 27b moves to a position 27b3 in the arc portion N as shown in FIG. 4C. In the state of FIG. 4C, the tape is being pulled out from the tape cassette.

Since the arc portion M is not concentric with an arc drawn by the movement of the sub chassis driving pin 27b about the center of the mode gear 27, the sub chassis adjusting plate 1b is pushed by the sub chassis driving pin 27b so as to move in the direction of arrow A. This means that the sub chassis 1 also moves in the direction of arrow A.

Figure 4D:
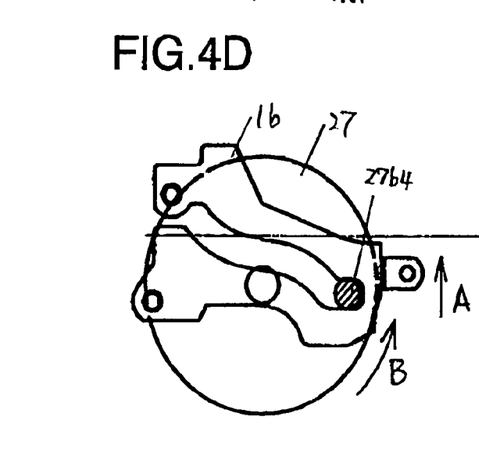

When the mode gear 27 further pivots in the direction of arrow B, the sub chassis driving pin 27b reaches a position 27b4, where the sub chassis driving pin 27b is in engagement with the straight portion N, as shown in FIG. 4D. The sub chassis 1 continuously moves in the direction of arrow A. In the state of FIG. 4D, the tape is still being pulled out from the tape cassette.

Figure 4E:
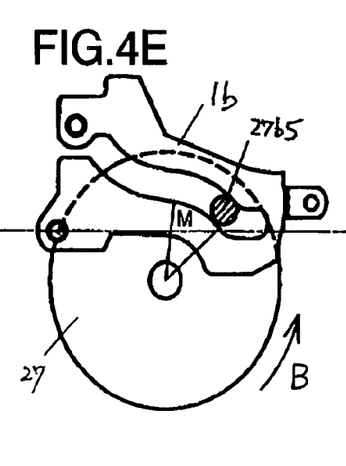

When the mode gear 27 further pivots in the direction of arrow B, the sub chassis driving pin 27b reaches a stop position 27b5 in the arc portion M as shown in FIG. 4E. In this state, the arc portion M is concentric with an arc drawn by the movement of the sub chassis driving pin 27b about the center of the mode gear 27. More specifically, the radius of the arc portion M is the same as the radius of an arc drawn by the center of the sub chassis driving pin 27b when the sub chassis driving pin 27b moves about the center of the mode gear 27. Therefore, the sub chassis adjusting plate 1b is in a pause without moving in the direction of arrow A.

In the state of FIG. 4E, the sub chassis driving pin 27b is at the stop position 27b5. In this state, the tape has been completely pulled out, and the sub chassis 1 is at the most forward position (a tape pull-out completion position), as described below with reference to FIG. 6. The sub chassis 1 cannot move any further from this state. The mode gear 27 further pivots in the direction of arrow B in order to obtain a play mode in which the magnetic tape can run.

Figure 4F:
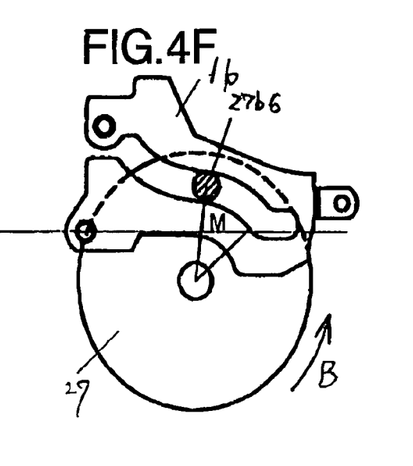

Since the sub chassis driving pin 27b is in the arc portion M which is concentric with an arc drawn by the movement of the sub chassis driving pin 27b about the center of the mode gear 27, the sub chassis adjusting plate 1b does not move in the direction of arrow A. After that, the sub chassis driving pin 27b reaches a play position 27b6 as shown in FIG. 4F. The play position is also referred to as a tape running position.

When the mode gear 27 pivots in the opposite direction from the direction of arrow B, the above-mentioned components also move in the opposite directions form those described above and the sub chassis 1 adjusting plate 1b moves in the opposite direction from the direction of arrow A.

As described above, in a simple structure where the sub chassis driving pin 27b is provided on the mode gear 27 which is pivotable, the sub chassis 1 can be stopped during a prescribed period and subsequently start moving, with the groove 1a of the sub chassis adjusting plate 1b being specifically shaped. Since the width of the groove 1a can be substantially the same as the diameter of the sub chassis driving pin 27b, the sub chassis 1 can be stably driven with no need to provide any extra gap between the groove 1a and the sub chassis driving pin 27b.

With reference to FIGS. 3 through 6, an operation of pulling out the magnetic tape from the tape cassette by relative movement of the sub chassis 1 with respect to the main chassis 21 will be described.

Figure 5:
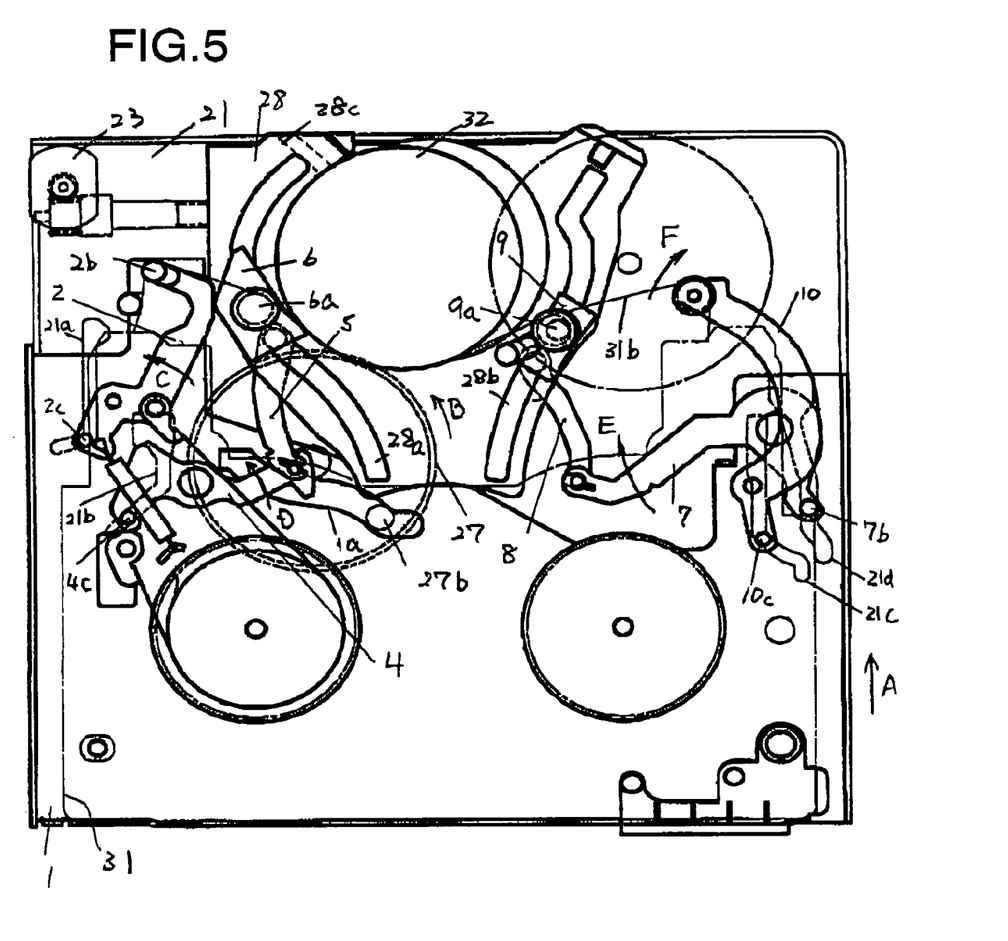
FIG. 5 is a plan view of the magnetic recording and reproduction apparatus according to the present invention in a state where the magnetic tape is being pulled out from the tape cassette.

FIG. 5 shows a state of the magnetic recording and reproduction apparatus where the sub chassis 1 moves in the direction of arrow A by about 5 mm from the state shown in FIG. 3. In FIG. 5, the sub chassis driving pin 27b and the groove 1a of the sub chassis adjusting plate 1b have the positional relationship shown in FIG. 4C. The sub chassis driving pin 27b reaches the position 27b3 shown in FIG. 4C by the movement of the mode gear 27 in the direction of arrow B.

In FIG. 5, as described above, the driving pins 2c, 4c, 7b and 10c of the elements 2, 4, 7 and 10 are respectively in engagement with the cam grooves 21a, 21b, 21d and 21c of the main chassis 21. Owing to such engagements, the elements 2, 4, 7 and 10 respectively pivot in directions represented by arrows C, D, E and F to move to the positions shown in FIG. 5. The S boat 6 and the T boat 9 are respectively guided by the guide grooves 28a and 28b to move to the positions shown in FIG. 5. As a result, the magnetic tape is pulled out to the position as represented by reference numeral 31b.

Figure 6:
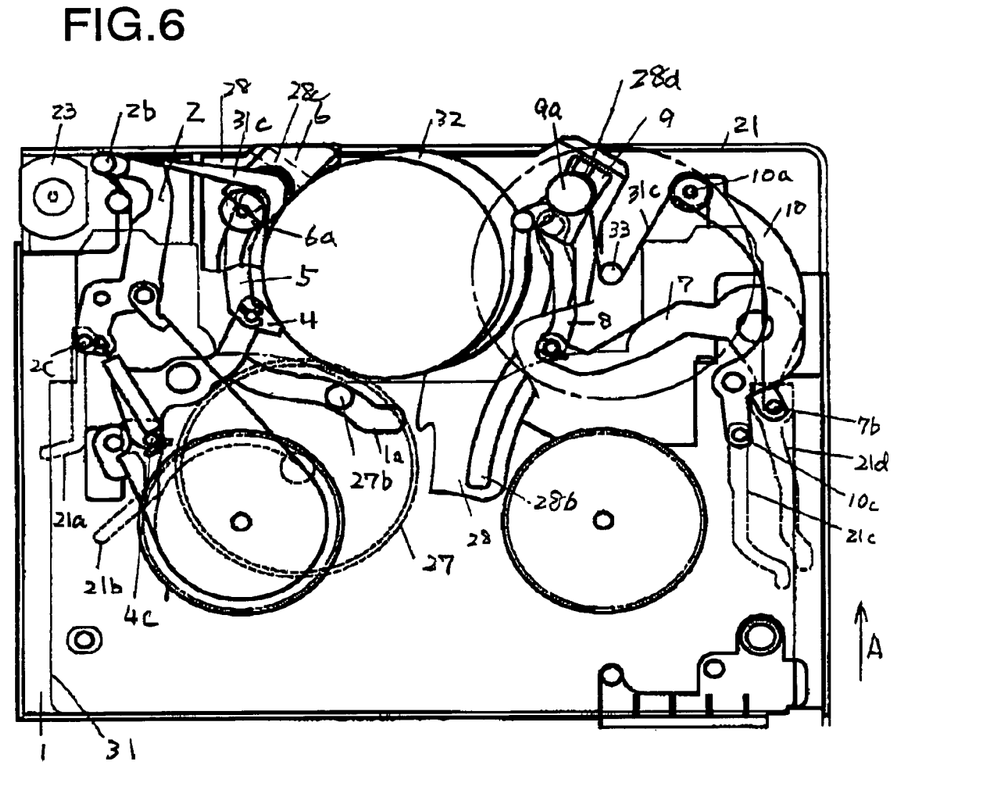
FIG. 6 is a plan view of the magnetic recording and reproduction apparatus according to the present invention in a state where the magnetic tape has been completely pulled out from the tape cassette.

FIG. 6 shows a state of the magnetic recording and reproduction apparatus, in which information recording to, or information reproduction from, the magnetic tape (represented by reference numeral 31c) is possible. The sub chassis 1 is at the tape pull-out completion position. This state is obtained from the state in FIG. 5 as a result of the mode gear 27 further moving in the direction of arrow B, the sub chassis 1 further moving in the direction of arrow A, and the tape 31b being wound around a rotatable head cylinder 32 provided on the cylinder base 28 on the main chassis 21. In FIG. 6, the sub chassis driving pin 27b and the groove 1a of the sub chassis adjusting plate 1b have the positional relationship shown in FIG. 4E. Therefore, the sub chassis 1 stays at this position although the mode gear 27 further pivots in the direction of arrow B, and the pinch roller (not shown) presses the magnetic tape 31c to a capstan shaft 33 and the capstan shaft 33 rotates to place the magnetic recording and reproduction apparatus into the play mode in which the magnetic tape 31c is driven.

In the state shown in FIG. 6, the S boat 6 acting to pull out the magnetic tape from the tape cassette is pressed to a positioning member 28c via the S arm 4 and the S link 5 via the twisted coil spring 29 (FIG. 2) and thus the position of the S boat 6 is determined. Similarly, the T boat 9 also acting to pull out the magnetic tape from the tape cassette is pressed to a positioning member 28d via the T arm 7 and the T link 8 via the twisted coil spring 30 (FIG. 2) and thus the position of the T boat 9 is determined.

With reference to FIGS. 7 and 8A through 8C, such a pressing positioning mechanism will be described.

Figure 7:
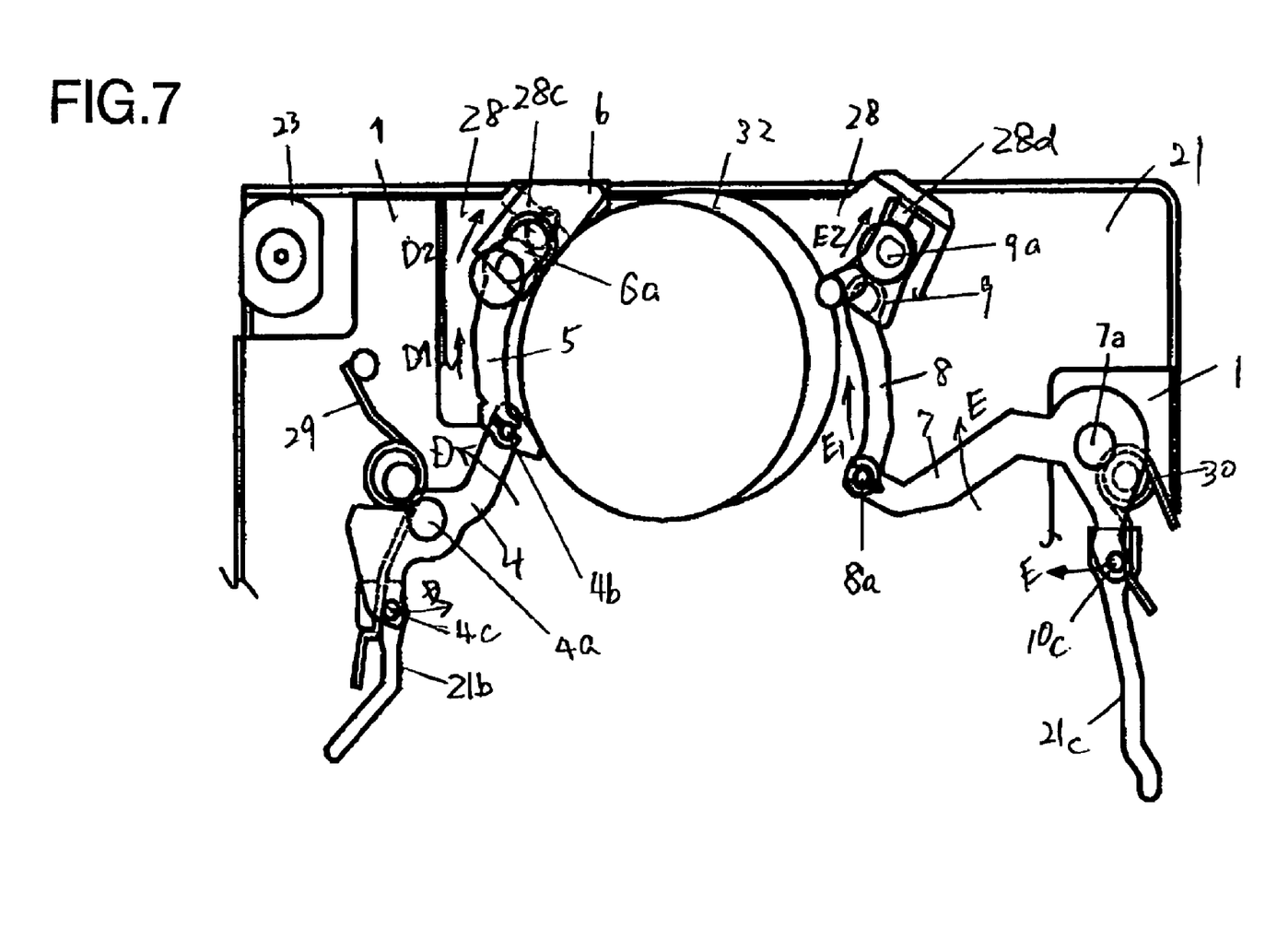
FIG. 7 is a partial view of FIG. 6 illustrating a positioning mechanism of the magnetic recording and reproduction apparatus.

FIG. 7 is a partial view of FIG. 6. With reference to FIG. 7, a method for determining the position of the S boat 6 will be described.

The S arm 4 on the sub chassis 1 reaches the position shown in FIG. 7 by the S arm driving pin 4c being guided by the cam groove 21b in the main chassis 21. In this state, the S arm driving pin 4c is in contact with the elastic twisted coil spring 29 mounted on the main chassis 21. Accordingly, the S arm 4 is pivoted in the direction of arrow D about the support 4a by the force of the twisted coil spring 29. This force presses the S link 5 in a direction of arrow D1 and presses the S boat 6 in a direction of arrow D2. Thus, the S boat 6 is pressed to the positioning member 28c on the cylinder base 28 and thus positioned here. In this manner, the magnetic tape is completely pulled out. Similarly, the T arm 7 is pivoted in the direction of arrow E about the support 7a by the force of the twisted coil spring 30. This force presses the T link 8 in a direction of arrow E1 and presses the T boat 9 in a direction of arrow E2. Thus, the T boat 9 is pressed to the positioning member 28d on the cylinder base 28 and thus positioned here. In this manner, the magnetic tape is completely pulled out. As described above, a pressing mechanism for the S boat 6 and the T boat 9 can be realized simply by elastic coil springs secured to the main chassis 21. A positioning mechanism for each boat can be realized by quite a simple structure. This contributes to the reduction of the number of components, size reduction and improvement in the quality of the tape pull-out mechanism.

Figures 8A, 8B:
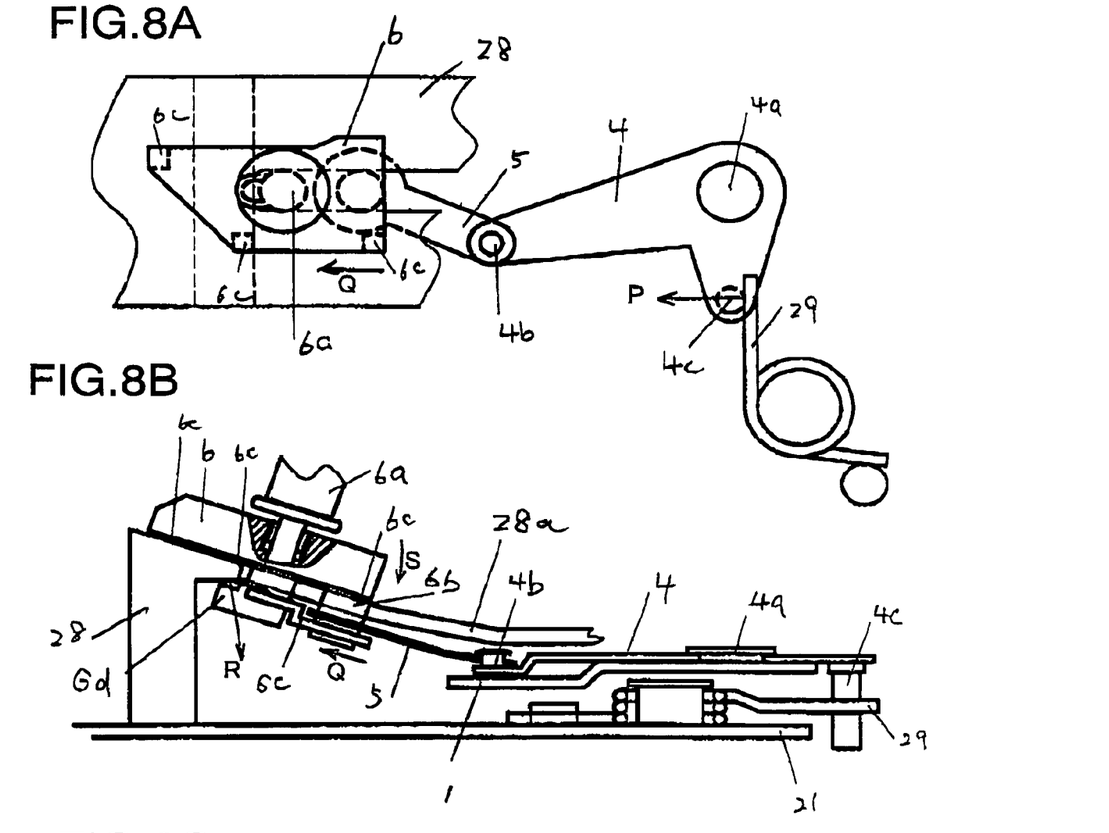
FIG. 8A is a plan view of the positioning mechanism shown in FIG. 7.
FIG. 8B is a side view thereof.
Figure 8C:
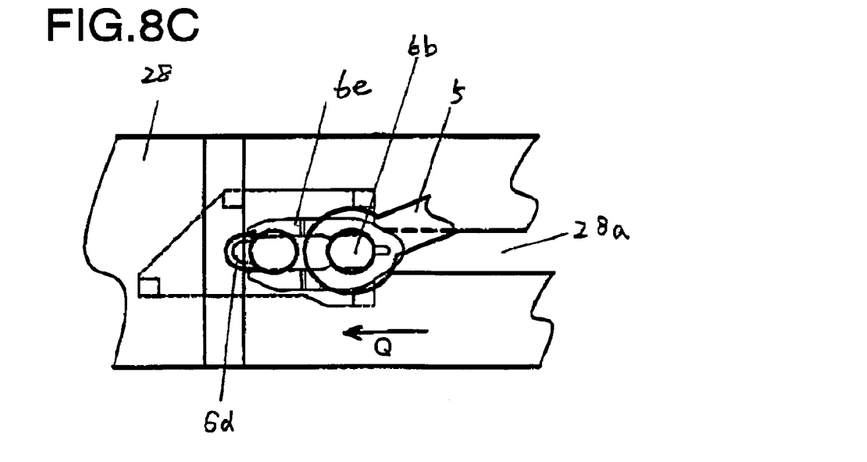
FIG. 8C is a bottom view thereof.

With reference to FIGS. 8A through 8C, the positioning mechanism for the S boat 6 will be described in more detail.

FIG. 8A is a plan view of the positioning mechanism for the S boat 6, FIG. 8B is a side view thereof, and FIG. 8C is a bottom view thereof. In FIGS. 8A through 8C, the elements are shown schematically.

The S arm 4 is urged by the elastic coil spring 29 in a direction represented by arrow P. Thus, a portion of the boss 6b which is below the guide groove 28a is pressed by the S link 5 (FIG. 8B). The S boat 6 includes a projection 6d having a semi-circular planar shape (FIG. 5C) integrally provided at a forward position on the bottom thereof. The cylinder base 28 has a ramp surface on a bottom surface thereof in the vicinity of the cylinder (not shown). The ramp surface is provided such that a normal thereto is in a direction of arrow R.

With reference to FIGS. 8A through 8C, an operation of the positioning mechanism for the S boat 6 will be described.

The lower portion of the boss 6b engaged with the S boat 6 is pressed by the S link 5, and thus the projection 6d of the S boat 6 is pressed to the ramp surface of the cylinder base 28. Accordingly, the entire S boat 6 is pressed in the direction of arrow Q while receiving a force in the direction of arrow R. Since the boss 6b is pressed in the direction of arrow Q, the S boat 6 also receives a force in a direction of arrow S. As a result, three points 6c on a bottom surface of the S boat 6 contact a top surface of the cylinder base 28. The top surface of the cylinder base 28 and the bottom surface of the S boat 6 are formed with high precision. By contact of the top surface of the cylinder base 28 and the bottom surface of the S boat 6, the S boat 6 is positioned with respect to the cylinder base 28 with high precision. As described above, the S boat 6 can be positioned with high precision by a simple structure by integrally providing the projection 6d in the S boat 6 and providing the ramp surface to the cylinder base 28. The S roller post 6a is provided on the S boat 6. The tilt of the S roller post 6a with respect to the main chassis 21 is very important for tape running. Such an important element can be positioned with high precision with a very simple structure. This allows the number of required components and the size of the apparatus to be reduced and also contributes to the improvement of the quality of the apparatus.

The positioning mechanism for the T boat 9 has substantially the same structure and operates in substantially the same manner as described above regarding the S boat 6.

Figure 9:
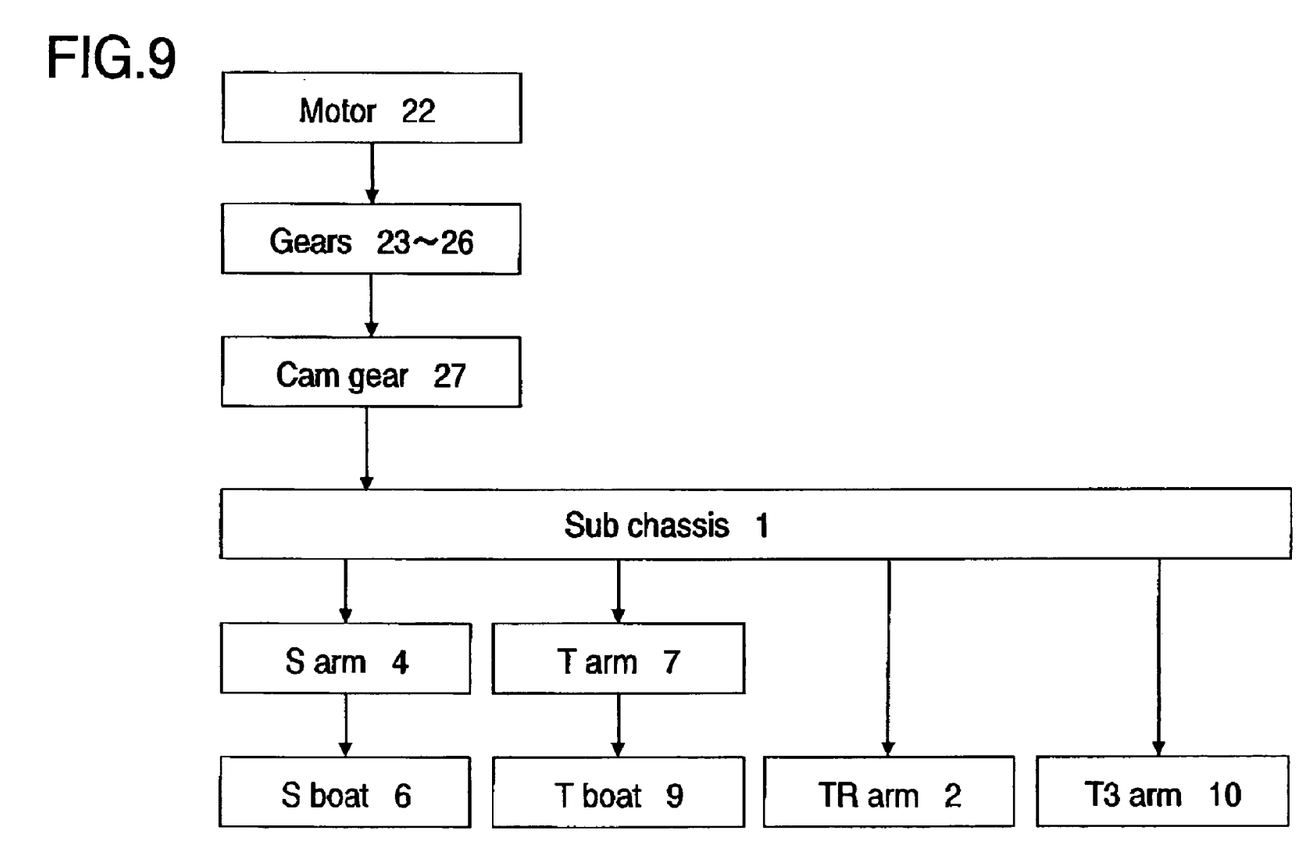
FIG. 9 shows a flow of force generated by a motor of the magnetic recording and reproduction apparatus according to the present invention.

As shown in FIG. 9, the flow of a driving force generated by the motor is streamlined. A simple flow of force by which elements acting for pulling out a magnetic tape from the tape cassette are moved by the movement of the sub chassis is realized.

As described above, according to the present invention, all the tape pull-out members 2, 6, 9 and 10 are provided on the sub chassis 1 and are driven by the movement of the sub chassis 1 with respect to the main chassis 21. Thus, the flow of a driving force generated by the motor is streamlined, and the structure of the magnetic recording and reproduction apparatus is simplified. This reduces the number of required components, weight, and production cost of the magnetic recording and reproduction apparatus. As shown in FIG. 2, the main chassis 21 has an irregular shape. This occurs since the reduction in the number of components generates an extra space in the main chassis 21 and that extra space is eliminated. In this manner, the size of the tape pull-out mechanism is also reduced.

In the above example, the twisted coil springs 29 and 30 are used as elastic members. The same effect is provided by using any elastic members such as, for example, leaf springs or resin springs.

In the above example, the main chassis 21 has four cam grooves. The same effect is provided by forming projections instead of grooves.

As described above, in a magnetic recording and reproduction apparatus including the main chassis 21 and the sub chassis 1, the present invention provides all the tape pull-out members 2, 6, 9 and 10 on the sub chassis 1 and drives the tape pull-out members 2, 6, 9 and 10 by the movement of the sub chassis 1 with respect to the main chassis 21. This significantly simplifies the tape pull-out mechanism. This leads to reduction of the number of required components, weight and size reduction, simplification of the structure, and improvement of the quality of the tape pull-out mechanism and also the magnetic recording and reproduction apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:

a main chassis having a rotatable head cylinder provided thereon;

a sub chassis on which a tape cassette is mountable; and a plurality of tape pull-out members representing all tape pull-out members included in the magnetic recording and reproduction apparatus acting so as to pull out a tape from the tape cassette;

wherein:

the sub chassis is movable with respect to the main chassis between a tape cassette mountable position and a tape pull-out completion position, and the tape cassette mountable position is the position at which the tape cassette is mountable on the sub chassis and the tape pull-out completion position is the position at which information recording to, and information reproduction from, the tape which has been pulled out from the tape cassette and wound around the rotatable head cylinder can be performed; and all the plurality of tape pull-out members are mounted on the sub chassis.

2. A magnetic recording and reproduction apparatus according to claim 1, wherein each of the plurality of tape pull-out members acts so as to pull out the tape from the tape cassette while the sub chassis moves from the tape cassette mountable position to the tape pull-out completion position.

3. A magnetic recording and reproduction apparatus according to claim 1, wherein at least one of the plurality of tape pull-out members is engaged with the main chassis.

4. A magnetic recording and reproduction apparatus according to claim 1, further comprising at least one cam section for driving at least one of the plurality of tape pull-out members; wherein the at least one of the plurality of tape pull-out members is engaged with a corresponding one of the at least one cam section, and the at least one cam section is provided on the main chassis.

5. A magnetic recording and reproduction apparatus according to claim 1, further comprising a securing guide section provided on the main chassis and an elastic member provided on the main chassis; wherein when the sub chassis moves to a position in the vicinity of the tape pull-out completion position, a portion of one of the plurality of tape pull-out members contacts the elastic member and thus the one of the plurality of tape pull-out members is pressed to the securing guide section, so as to position the one of the plurality of tape pull-out members at a prescribed position.

* * * * *